Patented Feb. 12, 1952

2,585,672

UNITED STATES PATENT OFFICE 2,585,672

PLASTIC COMPOSITIONS OF ACRYLO-NITRILE POLYMERS

Pierre Mosse, Lyon, France, assignor to Societe Rhodiaceta, Paris, France

No Drawing. Application February 17, 1951, Serial No. 211,569. In France October 31, 1950

2 Claims. (Cl. 260—32.6)

This invention relates to plastic compositions of acrylonitrile polymers and has particular relation to new and improved compositions, in which said polymers are dissolved in a new solvent. The invention also relates to the production of filaments, threads, films and similar products from said compositions.

The main object of the present invention is to provide new and improved compositions from polymers of acrylonitrile.

It is also an object of my invention to provide an improved process for producing filaments, threads, films and similar products from acrylonitrile polymers.

Other objects and the advantages of the invention will be apparent from the appended claims and the following specification which describes, by way of example and without limitation, some embodiments of the invention.

It has been known that filaments, threads, films, fibres, molded products and similar articles can be produced by the evaporation of solutions of acrylonitrile polymers in a suitable solvent, such as dimethyl formamide, dimethyl methoxyacetamide, N-formylmorpholine and others.

It has now been found that unexpected and improved technical effects are obtained by using for the dissolution of acryacrylonitrile polymers a mixture of dimethyl formamide and cyclohexanol.

The solutions embodying my present invention show, particularly at ordinary room temperatures, such as for example 15°–25° C., a substantially lower viscosity than that of compositions of equal concentration, which contain the same polymer dissolved in dimethyl formamide alone.

It is remarkable that very small proportions of cyclohexanol in the mixed solvent, are sufficient for obtaining a considerable reduction of viscosity, and the spinning characteristics of compositions obtained according to the present invention, are at least as good as those of compositions prepared with dimethyl formamide as the only solvent. For example, in comparison with a solution containing 15% of a polymer of acrylonitrile dissolved in dimethyl formamide, solutions containing likewise 15% of the same polymer dissolved in a mixture of 98% of dimethyl formamide and 2% cyclohexanol, show at 20° C. a viscosity which is 3.5 times lower than the viscosity of said solution in dimethyl formamide only. (The %'s refer to parts by weight.)

Furthermore, solutions according to my invention remain in the condition of suspensions at higher temperatures and, therefore, they more easily endure accidental rises of temperature, which may occur during malaxation, transportation and the like.

These two properties, i. e. lower viscosity and higher resistance to elevated temperature, represent considerable technical advantages.

Finally, it has been found that in the use of compositions according to the invention, for the production of threads, fibres, films and analogous products, said compositions can be extruded much easier than solutions prepared with dimethyl formamide alone, and the products obtained have the great advantage that they can be drawn out at relatively low temperatures even several days after their preparation.

The term "polymers of acrylonitrile" or "acrylonitrile polymers" is used in the present specification and claims to include not only the polyacrylonitrile proper, but also co-polymers and interpolymers of acrylonitrile with other polymerizable substances, for example vinyl halides, vinylidene halides, vinyl esters and ethers, acrylic and methacrylic acids and their derivatives, particularly their amides, styrene, vinylimidazole and others.

The following examples illustrate some embodiments of the invention, to which the invention is not limited. The parts and %'s refer to weights.

Example 1

A composition is prepared from the following ingredients:

240 parts of polyacrylonitrile
760 parts of a solvent consisting of 96.5% of dimethyl formamide and 3.5% of cyclohexanol.

This composition is subjected to spinning according to a known process. A practically colorless thread is obtained which can be easily drawn out to several times its length, in boiling water, even after 24 hours storage and the threads obtained are of excellent quality.

Example 2

The following ingredients are subjected to malaxation at 30° C. until a homogeneous composition is formed:

260 parts of a co-polymer containing in the molecule 98% of polyacrylonitrile and 2% of polyacrylamide;
740 parts of a solvent consisting of 85% of dimethyl formamide and 15% of cyclohexanol.

This composition is subjected to spinning according to a known process. The threads obtained are almost colorless and can be drawn out without difficulty to 550% of their length, in water of 95°.

It will be understood that the present invention is not limited to the specific materials, steps, proportions, and other specific details described above and can be carried out with various modifications. For example, the proportions between dimethyl formamide may be varied within wide limits. I have found that the above described beneficial effects are obtained in the presence of as little as 1% of cyclohexanol, based on the total weight of the solvent. The upper limit of cyclohexanol added to the dimethyl formamide amounts to about 20% based on the total weight of the solvent.

The polymers, co-polymers and interpolymers used in carrying out my invention are prepared according to conventional methods, for example by polymerization of the dissolved or emulsified monomeric materials in the presence of a catalyst. I prefer the use of polymers, co-polymers and interpolymers, in which at least about 85% of the polymer is acrylonitrile and the molecular weight of which is in the range of 15,000–250,000 or higher.

What is claimed is:

1. A new composition comprising a polymer of acrylonitrile dissolved in a solvent consisting of 99 to 80% of dimethyl formamide and 1 to 20% of cyclohexanol based on the total weight of the solvent.

2. A process for producing filaments, threads and similar products from acrylonitrile polymers, comprising dissolving said acrylonitrile polymers in a solvent consisting of 99 to 80% of dimethyl formamide and 1 to 20% of cyclohexanol, based on the total weight of the solvent, and subjecting the compositions thus formed to shaping and evaporation of the solvent.

PIERRE MOSSE.

REFERENCES CITED

The following references are of record in the file of this patent:

UNITED STATES PATENTS

| Number | Name | Date |
|---|---|---|
| 2,404,714 | Latham | July 23, 1946 |